United States Patent Office 3,740,436
Patented June 19, 1973

3,740,436
LOW IMPURITY HYDRAZINE
James G. Rigsby, Lake Charles, La., assignor to
Olin Corporation, New Haven, Conn.
No Drawing. Continuation-in-part of application Ser. No.
881,589, Dec. 2, 1969, now U.S. Patent No. 3,652,218,
dated Mar. 28, 1972. This application June 10, 1971,
Ser. No. 151,928
Int. Cl. C01c 1/00
U.S. Cl. 423—407                                     6 Claims

ABSTRACT OF THE DISCLOSURE

Purification of aqueous solutions of hydrazine and lower alkyl hydrazines by the removal of sodium and other cations, chloride, carbonate and other anions from aqueous solutions of such hydrazines. The product solutions have, at most, extremely low limits of ionic impurities.

---

This is a continuation-in-part of co-pending Ser. No. 881,589 filed Dec. 2, 1969, now U.S. Pat. 3,652,218, issued Mar. 28, 1972.

The commonly used Raschig synthesis of hydrazines reacts aqueous sodium hypochlorite with aqueous ammonia to form chloramine which reacts further with ammonia to form hydrazine according to Equations 1 and 2:

(1)    $NaOCl + NH_3 \rightarrow NH_2Cl + NaOH$ (2)    $NH_2Cl + NaOH + NH_3 \rightarrow N_2H_4 + NaCl + H_2O$ When primary or secondary lower alkyl amines are substituted for ammonia in Equation 2, the corresponding lower alkyl substituted hydrazines result.

In addition to synthesis reactions 1 and 2, side reactions occur to some extent as represented by Equations 3 and 4:

(3)    $3NH_2Cl + 2NH_3 \rightarrow N_2 + 3NH_4Cl$ (4)    $2NH_2Cl + N_2H_4 \rightarrow N_2 + 2NH_4Cl$ By-product sodium chloride is formed according to Equation 2 in a 1:1 molar ratio with the desired hydrazine product and ammonium chloride is formed in lesser proportions according to Equations 3 and 4. These chlorides and any other relatively non-volatile by-products are removed by flashing the more volatile hydrazine and water from the relatively non-volatile by-products.

The hydrazines are concentrated and refined by distillation and/or extraction.

In spite of these process operations, aqueous hydrazine solutions, containing up to 65 percent of $N_2H_4$, the $N_2H_4 \cdot H_2O$ hydrate, still contain minor amounts of ionic impurities, particularly sodium chloride. These amounts, in parts per million (p.p.m.), are not of consequence for many uses of hydrazine but they are objectionable for certain uses, for example, in electroplating and in nuclear-powered electric generating plants. For these and other purposes, it is required that aqueous hydrazine solutions be provided which contain preferably zero p.p.m. NaCl or, at least, below 10 p.p.m.

One object of this invention is to provide a method for the purification of aqueous solutions of hydrazines. More particularly, an object of this invention is to provide a method for the removal therefrom of these small amounts of ionic impurities. A further object is to provide purified aqueous hydrazine uniquely suitable for certain uses. Other and further objects appear in the following description.

The objects of this invention are achieved by contacting the aqueous hydrazine solution in one step with the hydrazinium form of strongly acidic cation exchange resins and in another step with the hydroxyl form of strongly basic anion exchange resins and separating the treated aqueous hydrazine from the resins. In a further embodiment of the invention, cyclic treatment of aqueous hydrazine solutions is contemplated in which a plurality of bodies of the cation and anion exchange resins are alternately used and regenerated to provide continuous treatment of the hydrazine solutions with or without automatic control of the treating and regenerating portions of the cycle.

In the process of the invention the cation exchange resin is used in either the first or second step, preceded or followed by the use of the anion exchange resin. Equally satisfactory results are obtained by either procedure.

It is known, for example, in U.S. Pat. 2,789,036 to remove anions such as chlorate, sulfate, chloride and ferrite from aqueous caustic soda by contacting the caustic solution with an anion exchange resin. U.S. Pat. 2,991,156 discloses removing iron from aqueous caustic soda by contacting the certain polyvinylbenzyl sulfonium halide resins. Glycerol has been purified by passage through successive beds of regenerated cation and anion exchange resins as described in Ind. Eng. Chem., vol. 43, pp. 1065–70 (1951). In addition, hydrazines have been purified as described in U.S. Pat. 3,458,283 by exchanging hydrazinium salt solutions with a cation exchange resin to adsorb hydrazinium ions on said resin and recovering the purified hydrazine by eluting the hydrazinium resin with aqueous caustic soda. It appears that great care would be required in this patented process to use exactly the stoichiometric quantity of caustic soda and to contact all of the hydrazinium resin with all of the aqueous caustic soda allowing ample time for complete interaction since any excess of the caustic soda or any unreacted caustic soda used in the elution must contaminate the product with ionic impurities.

Aqueous hydrazines are strongly basic and are strong reducing agents which interact with many ion exchange resins. Some of the resins are degraded, substantially inactivated or rendered inoperative by such interaction. For example, aqueous hydrazine, reacting with the hydrogen form of active cation exchange resins, generates quantities of heat. Proper design and control is required to dissipate such heat to prevent melting certain resins. Other problems arise which are solved by the process of the present invention.

In operation, fresh or acid-regenerated cation exchange resin is first converted to the hydrazinium form of resin under conditions providing dissipation of heat at an adequate rate to avoid damaging the resin. With certain resins, this operation is suitably performed in the tower or container for holding the bed of resin as it is to be used in de-cationizing the aqueous hydrazine depending on ambient air to dissipate the heat liberated. In other instances, this preliminary treatment is suitably carried out in a separate vessel equipped with jackets and/or cooling coils to remove the heat. Similarly, regeneration of the exhausted or partly spent resin with acid requires suitable provision for heat control.

The strongly basic anion exchange resins suitable for use according to the present invention are usually initially in the hydroxyl form but, if not, they are converted to the hydroxyl form by treatment with aqueous alkali, preferably caustic soda. The spent or partially exhausted resins are also regenerated with aqueous caustic soda. Suitable precautions are taken to dissipate the heat liberated in both of these processes.

In continuous operation, the aqueous hydrazine flows through a bed of the cation exchange resin initially in the hydrazinium form and then through a bed of the anion exchange resin initially in the hydroxyl form. Alternatively, the aqueous hydrazine flows through a bed of the anion exchange resin initially in the hydroxyl form and then through a bed of the cation exchange resin initially in the hydrazinium form. When the resin beds are partially spent and passage of ions through the beds is imminent, the flow of aqueous hydrazine is switched to a parallel pair of towers and flows through beds of regenerated resins. While the aqueous hydrazine is flowing through the second pair of towers, the resins in the first pair of towers is suitably regenerated. The cation exchange resin bed is washed by flowing soft or deionized water through it to remove aqueous hydrazine, then aqueous acid, preferably hydrochloric acid, about 1 to 10 percent HCl is passed through the bed until cations other than hydrogen are substantially removed and then water is again passed through the bed until chloride ions are substantially removed. Similarly, the anion exchange resin bed is regenerated by flowing soft or deionized water therethrough to remove aqueous hydrazine, then aqueous alkali, preferably caustic soda, about 1 to 10 percent is passed through the bed until anions other than hydroxyl are substantially removed and then water is again passed through the bed until sodium ions are substantially removed. The regenerated beds are suitably covered with soft or deionized water until used. The aqueous hydrazine washed from both beds is recycled to storage of impure hydrazine for further treatment or, if too dilute, to the hydrazine plant for concentration.

The reactions involved in the process of the present invention, including regeneration reactions, using R nonstoichiometrically to represent the resins, are as follows:

Cation exchange resin

Pretreatment:

$R.H + N_2H_4 \rightarrow R.N_2H_5$

Deionization:

$R.N_2H_5 + Na^+ \rightarrow R.Na + N_2H_4 + H^+$

Regeneration:

$R.Na + HCl \rightarrow R.H + NaCl$

Anion exchange resin

Pretreatment:

$R.Cl + NaOH \rightarrow R.OH + NaCl$

Deionization:

$R.OH + Cl^- \rightarrow R.Cl + OH^-$

Regeneration:

$R.Cl + NaOH \rightarrow R.OH + NaCl$

The process of this invention is useful in purifying aqueous solutions of hydrazine and of lower alkyl hydrazines having 1 to 4 carbons per alkyl group and from 1 to 2 alkyl groups per nitrogen, whether made by the Raschig process or otherwise. Examples of such alkyl substituted hydrazines include monomethylhydrazine, unsdimethylhydrazine, sym-dimethylhydrazine, ethylhydrazine, ios-propylhydrazine, secondary and tertiary butylhydrazine.

In the deionization operations according to the present invention, temperatures at which fusion, deactivation or damage to the resins occurs are to be avoided. Generally, temperatures are maintained below 300° F. to avoid damage to the resins. A hot process stream of aqueous hydrazine to be deionized is appropriately cooled as necessary to avoid damage to the resin. Otherwise, temperatures of operation are not critical and are suitably as low as zero ° F.

Besides sodium and chloride ions, minor amounts of other cations and anions are effectively removed by the process of the present invention. In the product, lithium, potassium, copper, iron, chromium, calcium, barium and strontium cations, if present, are reduced to negligible amounts. Similarly, carbonate, bromide, iodide, nitrate and other anions, if present, are reduced to negligible amounts.

The cation exchange resins are of the strong acid type, for example, sulfonic acids and salts. These include sulfonated polystyrene resins, sulfonated phenol-formaldehyde resins and other sulfonic acid types. The anion exchange resins are of the strongly basic type, for example amine or quaternary salts. These include polystyrene-substituted quaternary ammonium salts, hydroxyalkyl quaternary type resins and other strongly basic types.

The method of this invention is useful for purification of strong aqueous solutions up to 65 percent $N_2H_4$ or higher. Dilute solutions having 5 percent or less of $N_2H_4$ are also effectively purified when costs can be economically justified. It is preferred to purify hydrazine solutions having from about 10 to 65 percent $N_2H_4$.

EXAMPLE I

An aqueous solution of hydrazine, containing 15 percent $N_2H_4$ and 225 p.p.m. NaCl was passed through a bed of sulfonated cation exchange resin and the effluent was passed through a bed of strongly basic anion exchange resin. The chloride content of the effluent was reduced to 20 p.p.m.

EXAMPLE II

An aqueous solution of hydrazine containing 11.3 percent $N_2H_4$ and 130 p.p.m. NaCl was passed successively through beds of strongly acidic cation exchange resin and strongly basic anion exchange resin. No chlorides were detected in the first 45 gallons of effluent. A total of 50 gallons of hydrazine was passed through the beds and this amounts to 920 gallons per cubic foot of resin. The last of the effluent contained only 7 p.p.m. NaCl.

EXAMPLE III

Aqueous hydrazine containing 13.9 percent $N_2H_4$ and 72 p.p.m. NaCl was passed successively through beds of strongly acidic cation exchange resin and strongly basic anion exchange resin. The cation resin bed was 2 inches in diameter, 36 inches deep and contained 0.0654 cu. ft. of bed. The anion resin bed was 2 inches in diameter, 48 inches deep and contained 0.0874 cu. ft. of bed. The aqueous hydrazine flow averaged 245 milliliters per minute and the total throughput was 94.9 gallons. The effluent, tested at intervals, averaged 6 p.p.m. NaCl. No change appeared in the hydrazine concentration.

EXAMPLE IV

Using fresh resins, the procedure of Example III was repeated. The feed of aqueous hydrazine contained 73 to 83 p.p.m. NaCl. A total of 75.12 gallons of aqueous hydrazine was passed through the beds. The product averaged 10.6 p.p.m. NaCl.

EXAMPLE V

Using fresh resins, the procedure of Example III was repeated. The feed of aqueous hydrazine contained 50 to 78 p.p.m. NaCl. The effluent, amounting to 62.52 gallons, averaged 11.6 p.p.m. NaCl.

EXAMPLE VI

Using fresh resins, the procedure of Example III was repeated. The feed of aqueous hydrazine contained 50 to 52 p.p.m. NaCl. The effluent, amounting to 93.18 gallons, averaged 6.6 p.p.m. NaCl.

EXAMPLE VII

The cation resin bed had a diameter of 4.7 cm., a depth of 60 cm. and a volume of 1041 cc. It was prepared by backwashing the column upwards for 12 minutes with 353 cc./min. of deionized water, regenerating for 21 minutes at 139 cc./min. with 9 percent hydrochloric acid and rinsing for 60 minutes with 139 cc./min.

of deionized water. The bed was left covered with deionized water until placed in use.

The anion resin bed had a diameter of 4.7 cm., a depth of 70 cm. and a volume of 1215 cc. It was prepared by backwashing the column upwards for 12 minutes with 353 cc./min. of deionized water, regenerating for 100 minutes using 41.3 cc./min. of 4 percent aqueous caustic soda and rinsing for 160 minutes with 81.4 cc./min. of deionized water. The bed was left covered with deionized water until placed in use.

Aqueous hydrazine containing 35.5 percent $N_2H_4$, 96 p.p.m. Na ion and 165 Cl ion was passed serially through the bed of cation exchange resin and the bed of anion exchange resin at a rate of 140 cc. per minute. Samples taken every 30 minutes showed zero sodium and averaged 10.2 p.p.m. chloride.

EXAMPLE VIII

The anion resin bed used in Example VII was backwashed upwards for 12 minutes using 353 cc./min. of tap water, regenerated for 30 minutes using 139 cc./min. of 9 percent HCl and rinsed for 70 minutes with 158 cc./min. of deionized water. The bed was left covered with deionized water until used.

The anion resin bed used in Example VVII was backwashed for 15 minutes using 230 cc./min. of tap water, regenerated for 80 minutes using 50 cc./min. of a 4 percent aqueous caustic soda and rinsed for 210 minutes using 87 cc./min. of deionized water. The bed was left covered with deionized water until used.

Each column was purged with nitrogen for 30 minutes to remove air and water. Then an aqueous solution of hydrazine containing 64.4 percent $N_2H_4$, 115 p.p.m. of Na ion and 130 p.p.m. of Cl ion was passed successively through the resin beds of 242 cc./min. After 3 hours, the effluent showed 0.02 p.p.m. Na ion and 0.8 p.p.m. Cl ion.

EXAMPLE IX

Hydrazine hydrate, containing 64.44 percent $N_2H_4$, 75 p.p.m. sodium ion, 60 p.p.m. chloride ion and 0.2 p.p.m. calcium ion was passed first through a column of anion exchange resin and then through a column of cation exchange resin, each column in a 100 ml. burette. Nine 100 ml. samples were passed through the anion column and then through the cation column. Average time through the anion column was 14 minutes. Average time through the cation column was 12 minutes.

Each 100 ml. sample thus treated was analyzed with the following results:

| Sample No. | Na+ p.p.m. | Ca++, p.p.m. | Cl-, p.p.m. | Transmittance, percent at 490 mµ. |
| --- | --- | --- | --- | --- |
| 1 | .01 | .02 | <1 | 80 |
| 2 | .02 | .03 | <1 | 81 |
| 3 | .02 | .03 | <1 | 95 |
| 4 | .02 | .03 | <1 | 94 |
| 5 | .03 | .02 | <1 | 93 |
| 6 | .02 | .03 | <1 | 92 |
| 7 | .03 | .02 | <1 | 93 |
| 8 | .03 | .03 | <1 | 93 |
| 9 | .03 | .03 | <1 | 92 |

EXAMPLE X

Hydrazine hydrate, containing 64.5 percent $N_2H_4$, 74 p.p.m., sodium ion, 73 p.p.m. chloride ion and 0.2 p.p.m. calcium ion, with light transmission of 98 percent was passed first through the cation exchange column and then through the anion exchange column, reversing the order of Example IX. Each 100 ml. sample thus treated was analyzed with the following results:

| Sample No. | Na+ p.p.m. | Ca++, p.p.m. | Cl-, p.p.m. | Transmittance, percent at 490 mµ. |
| --- | --- | --- | --- | --- |
| 1 | .6 | .06 | <1 | 100 |
| 2 | .28 | .03 | <1 | 99 |
| 3 | .1 | .02 | <1 | 98 |
| 4 | .08 | .02 | <1 | 100 |
| 5 | .07 | .02 | <1 | 98 |
| 6 | .05 | .03 | <1 | 100 |
| 7 | .09 | .05 | <1 | 94 |
| 8 | .05 | .04 | <1 | 95 |
| 9 | .05 | .03 | <1 | 96 |

What is claimed is:

1. A method of removing ionic impurities from an aqueous solution of hydrazine by contacting said solution first with the hydroxyl form of a strongly basic anion exchange resin and separating from said anion exchange resin the first treated aqueous hydrazine, contacting said first treated aqueous hydrazine with a strongly acidic cation exchange resin in hydrazinium form and separating the second treated aqueous hydrazine from said cation exchange resin.

2. The method as claimed in 1 in which said cation exchange resin is a sulfonated polystyrene resin.

3. The method as claimed in claim 1 in which said anion exchange resin is a polystyrene-substituted quaternary ammonium resin.

4. The method as claimed in claim 1 in which said aqueous solution of hydrazine contains from 10 to 65 percent $N_2H_4$.

5. The method as claimed in claim 1 in which said contacting is maintained at temperatures between 0° and 300° F.

6. The method as claimed in claim 1 in which a flow of impure aqueous hydrazine is maintained through a first bed of said anion exchange resin and then through a first bed of said cation exchange resin until elution of ions from said beds of ion exchange resin reaches a predetermined limit, transferring said flow of impure aqueous hydrazine through second beds of said resins, regenerating said first beds of resins while said flow of aqueous hydrazine passes through said second beds of resins, transferring said flow of impure aqueous hydrazine to the regenerated first beds and repeating the cycle.

References Cited
UNITED STATES PATENTS

| 3,469,940 | 9/1969 | Needham et al. | 23—190 R |
| Re. 24,213 | 9/1956 | Blaricom et al. | 260—2.2 R |
| 2,789,036 | 4/1957 | Tillman | 423—181 |

OSCAR R. VERTIZ, Primary Examiner

H. S. MILLER, Assistant Examiner